United States Patent
Schumacher et al.

(10) Patent No.: US 6,379,243 B1
(45) Date of Patent: Apr. 30, 2002

(54) SIEVE FOR A THRESHER, ESPECIALLY A COMBINE-HARVESTER FOR HARVESTING GRAINS

(75) Inventors: Friedrich-Wilhelm Schumacher; Gustav Schumacher, both of Eichelhardt (DE)

(73) Assignee: Gebr. Schumacher Geratebaugesellschaft mbH (DE)

( * ) Notice: Subject to any disclaimer, the term of this patent is extended or adjusted under 35 U.S.C. 154(b) by 0 days.

(21) Appl. No.: 09/596,284

(22) Filed: Jun. 15, 2000

(30) Foreign Application Priority Data

Jun. 18, 1999 (DE) .......................... 199 27 933

(51) Int. Cl.⁷ ................................. A01F 12/44
(52) U.S. Cl. ......................... 460/101; 209/394
(58) Field of Search ................. 460/100, 101, 460/902, 102; 209/394, 397, 398, 22, 28

(56) References Cited

U.S. PATENT DOCUMENTS

| | | | |
|---|---|---|---|
| 40,242 A | * 10/1863 | Capell | 209/397 |
| 434,247 A | * 8/1890 | Closz | 209/397 |
| 807,355 A | * 12/1905 | Campbell | 209/397 |
| 1,462,804 A | * 7/1923 | Evans | 209/298 |
| 2,250,383 A | * 7/1941 | Koester | 209/22 |
| 2,827,169 A | * 3/1958 | Cusi | 209/397 |
| 3,374,886 A | * 3/1968 | Lightsey | 209/28 |
| 3,759,380 A | * 9/1973 | Mathews | 209/22 |
| 4,758,333 A | * 7/1988 | Masica et al. | 209/397 |
| 5,176,574 A | 1/1993 | Matousek et al. | |
| 5,944,993 A | * 8/1999 | Derrick et al. | 210/388 |
| 6,000,556 A | * 12/1999 | Bakula | 210/388 |

FOREIGN PATENT DOCUMENTS

| | | |
|---|---|---|
| CH | 227083 | 5/1943 |
| DE | 255872 | 2/1912 |
| DE | 76 32 151 U | 10/1975 |
| FR | 655798 | 4/1929 |
| FR | 1279012 | 11/1961 |
| GB | 691725 | 5/1953 |

\* cited by examiner

*Primary Examiner*—Robert E. Pezzuto
*Assistant Examiner*—Aárpád Fábián Kovács
(74) *Attorney, Agent, or Firm*—Harness, Dickey & Pierce, P.L.C.

(57) ABSTRACT

A combine-harvester for harvesting grains has a zigzag arrangement and is formed from repeating portions (13, 13a, 13b, 13c) which each portion includes a profile (14, 14a, 14b, 14c). Each profile has a first leg (16), which is arranged at an angle to a second leg (18). The first leg (16) is provided with an extension (22). The extension is arranged parallel to the first leg (16) in a transverse direction to the conveying direction (6) and ends at an edge. The extension (22) projects in conveying direction (6) beyond the connection area (19) of the first leg (16) with the second leg (18). The extension is arranged ahead of the second leg (18) in the conveying direction (6). Stems (27), which possibly fall onto the sieve surface, are carried by the extensions (22). As a result of the movement of the sieve as it is moved in the conveying direction (6), the stems fall off the sieve surface (5).

9 Claims, 2 Drawing Sheets

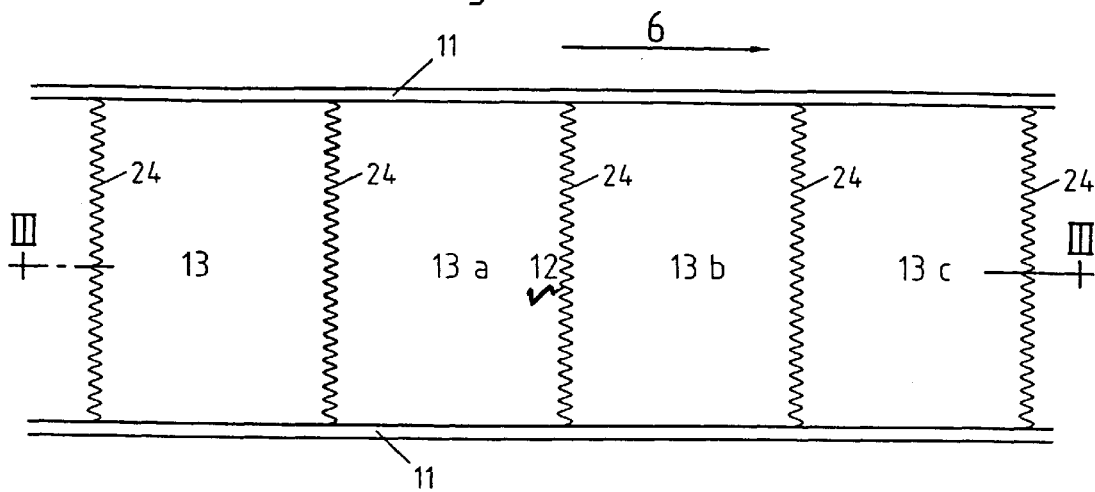
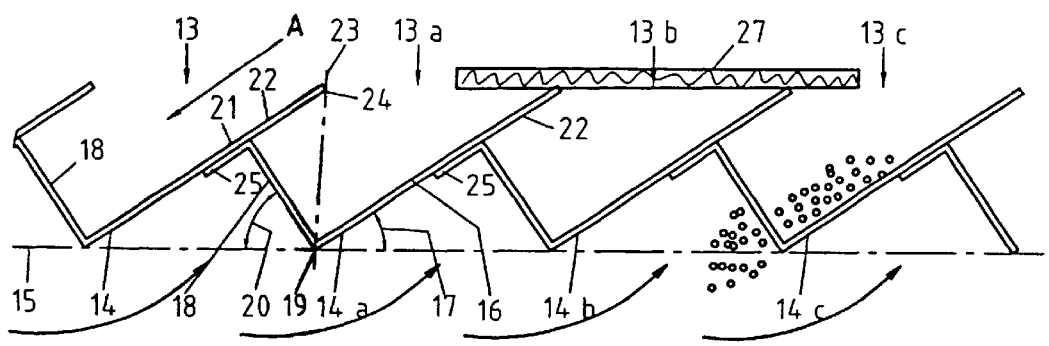
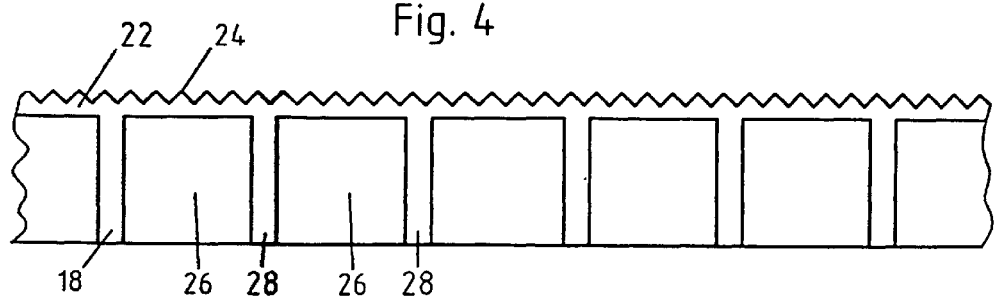

SIEVE FOR A THRESHER, ESPECIALLY A COMBINE-HARVESTER FOR HARVESTING GRAINS

CROSS-REFERENCE TO RELATED APPLICATION

This application is based upon and claims priority to German Patent Application 199 27 933.0 filed Jun. 18, 1999, which application is herein expressly incorporated by reference.

BACKGROUND OF THE INVENTION

The invention relates to a sieve for a thresher, especially to a combine-harvester which harvests grains. Its sieve surface has, when viewed in a section arranged parallel to the conveying direction, a base-profile with a zigzag arrangement.

In combine-harvesters, as a rule, two superimposed supported sieves are positioned and connected downstream from the threshing device. The sieves are subjected to a shaking motion which, in turn, transports the to be cleaned harvested material in the conveying direction. The upper sieve serves to separate coarser chaff and straw parts, in the technical jargon also called non-grain components, from the grains. The upper sieve transports these to the back out of the cleaning system. The sieved harvesting material falls through the upper sieve onto the fine sieve arranged below it. The rest of the non-grain-components of the harvesting material is separated by means of this sieve and is also transported to the back. Both sieves are blown through by an air stream of a fan. The air stream lifts the lighter chaff and straw parts up, so that these are also transported by means of the air stream over the sieves to the back. The specifically heavier grains fall through the sieves and are conveyed in the known way by the conveying equipment to a grain tank or are filled into sacks. Ears or panicle parts, which may still contain grains, fall through a sieve extension of the upper sieve or reach via the lower sieve a conveyor. The conveyor conveys these parts again to the threshing device for renewed threshing. Modern combine-harvesters in order to increase efficiency, have very aggressive threshing mechanisms, for example multipath drum systems or friction cylinder systems.

A combine-harvester with sieve devices is disclosed in U.S. Pat. No. 5,176,574. A disadvantage of this system is that along with the grain and chaff, a large amount of threshed straw is conveyed onto the cleaning sieves. This has the effect that, when the threshing devices are getting more powerful, the load of the downstream connected sieves is disproportionally increased. For example, the power increase is reversed to the opposite by the aggressive threshing devices when dry and brittle straw is threshed. As the threshed straw forms a straw-chaff-grain mixture, the sieves are overstrained. To improve the capacity of the sieves, different systems are provided. It is known, to provide adjustable finned sieves. These sieves, however, have the disadvantage that a gap is formed between the single fins which are attached transversely to the air stream. Stems, which are lying transversely or parallel to the conveying direction, enter the gap and are passed to the lower sieve. This is due to the fact that the stems do not have enough surface area so that the air stream can blow the stems to the back. If the air stream is increased so that the stems are transported to the back, harvesting material is also blown beyond the sieve and the sieve box, which leads to a non-acceptable loss of harvesting material. The adjustability however has the advantage that the adjustment angle of the fins can be changed compared to the conveying direction and to the air stream. This becomes disadvantageous, when the driver of the combine-harvester is not in position to find the correct setting corresponding to the harvesting material. Instructions for the settings do in fact exist for the different grain types. However, the different harvesting conditions are so manifold, that a proposed setting can sometimes be completely wrong. Undergrowth, brittle straw, the moisture content of the straw, the grain and chaff parts play a role to provide wrong settings. Work on inclined areas or hilly areas is a decisive influence for wrong settings since these parameters can not be accounted for by any predetermined setting. Thus, the respective optimum settings adapted to the harvesting conditions are thus only found by very experienced drivers. To optimize cleaning of the harvested material, it is necessary to open the sieves as far as possible. However, this is not normally done since the grain flow rate is too small and the actual power capacity of the expensive combine-harvester is not used to full capacity.

Adjustable fin sieves have another disadvantage. Due to their design, their weight is high and the shaking drive of the sieve device is correspondingly strongly strained. This causes unwanted vibration, which can be transferred through the whole machine. Furthermore the suspension is effected by strong wear. Accordingly, the sieve is worn out after a few harvesting periods and has to be replaced. Further such fin sieves are complicated and expensive in their manufacture.

Utility model DE 76 32 151 U discloses an alternative sieve design. Here, a section of the sieve parallel to the conveying direction has a sieve surface with a zigzag arrangement. One leg of each portion is arranged with a smaller inclination angle than the other one to an imaginative horizontal plane. The leg, which is arranged in front in the conveying direction, is arranged with a smaller inclination. The leg arranged behind in the conveying direction has large through-holes, which are formed in the form of windows. The grains fall through the windows to reach the bottom downwards to the conveying device or to the following sieve. A disadvantage of this system is that straw stems, which are aligned in the conveying direction, reach into the openings directed downwards in an inclined manner and cannot be blown to the back by the blower wind. The stems move from the first sieve against the conveying direction down and are mixed with the harvesting material or the stems strain the fine sieve, which is arranged below the first sieve.

U.S. Pat. No. 5,176,574 discloses a sieve, which is similar in its basic design to the sieve according to the above mentioned utility model. Here, the single fins, which in the cross-section are angled, are arranged continuously transversely to the conveying direction. Each fin lies against the neighboring fin and is respectively connected to it. The advantage of such a sieve is the high grain flow rate capacity, its inexpensive design, as well as its light weight. Its non-adjustability means that no error-settings can be carried out. The disadvantage of this sieve is that straw stems, which are aligned in the conveying direction, can enter the passage openings inclined downwards and become wedged there or the stems strain the below arranged fine sieve.

SUMMARY OF THE INVENTION

It is an object of the present invention to provide a simple and light sieve in its basic design, which combines a high flow rate capacity with an optimum cleaning efficiency. The sieve is also usable for the majority of different harvesting materials.

The object is solved according to the invention by a sieve, including a sieve surface, which when viewed in section, is arranged parallel to the conveying direction. The sieve has a basic profile with a zigzag arrangement. The zigzag is constructed by repeated consecutive portions with each including a first leg and a second leg. Both legs are arranged such that they enclose an angle between each other. The first leg is arranged ahead of the second leg in the conveying direction. The first leg is arranged at an angle to a first imaginative horizontal plane. The angle is smaller than the angle, which the second leg encloses with said first plane. Both legs form a groove. The groove is arranged transversely to the conveying direction. Openings are arranged in the second leg in a distributed manner. The respective first legs are provided with an extension, which ends in an edge. The extension projects in the conveying direction beyond the connection area of the first leg with the second leg. Thus, the extension is arranged ahead of the second leg in the conveying direction. The extensions are arranged along the first leg in the transverse direction to the conveying direction.

In this embodiment it is advantageous that straw stems, which are aligned in the conveying direction, are held higher by the extensions above the leg with the openings through which the grains fall. Further they are transported by the edges in the conveying direction. Therefore, the stems are effectively prevented from entering into the openings, which receive the grains. Thus, the sieve ensures that the fine sieve arranged below the first sieve can be kept free of stems. Accordingly, the fine sieve is not clogged. A straw stem, which is transversely aligned to the conveying direction, is accelerated in the following oscillating amplitude by the solid part of the second leg which remains between the openings. Accordingly, the stems are further conveyed in the conveying direction. Furthermore stems, which are aligned transversely to the conveying direction, compared to the stems which are aligned parallel to the conveying direction, offer a relatively large attack area for the air stream. Thus, the stems with the support of the oscillating amplitude and the air stream are transported without problems in the conveying direction.

In an embodiment according to the invention, the extension is arranged nearly in a plane with the first leg. It is possible to attach the extension on or to the first leg. Various known welding methods can be used for the connection. An integral arrangement with the first leg is also sensible.

An improved effect is achieved by the edge of the extension reaching nearly up to a second imaginary plane. The second imaginary plane is arranged at a right angle on the first plane and the connection area between a first leg and second leg.

A simple way to manufacture the sieve surface is to construct it from profiles running transverse to the conveying direction. Each profile corresponds, respectively, to a portion. Each profile has a connection leg which projects, when seen in a section parallel to the conveying direction, from the end of the second leg to the first leg in an opposing direction. Also, the connecting leg is arranged parallel to the first leg. A type of Z-profile is achieved. The profiles are connected to each other, respectively, to form a sieve surface. The profiles can be made from metal sheet, especially by bending the steel sheet. It is also possible to make the profiles from casting of aluminum or plastic material, for example. It is also possible to design the whole sieve as a casting component from aluminum as well as plastic material. To further enhance the edge, the extension is formed as a zigzag. Instead of the zigzag arrangement, a sharp-edged arrangement can be chosen. Especially by a zigzag arrangement the stems are prevented from sliding onto one side of the sieve in a working location on a slope.

From the following detailed description, taken in conjunction with the drawings and subjoined claims, other objects and advantages of the present invention will become apparent to those skilled in the art.

BRIEF DESCRIPTION OF THE DRAWINGS

FIG. 2 is a top view of a sieve according to the invention.

FIG. 3 is a sectional view of FIG. 2 along line III—III thereof.

FIG. 4 is a plan view in the direction of the arrow A of FIG. 3.

DETAILED DESCRIPTION OF THE PREFERRED EMBODIMENT

Figure 1:
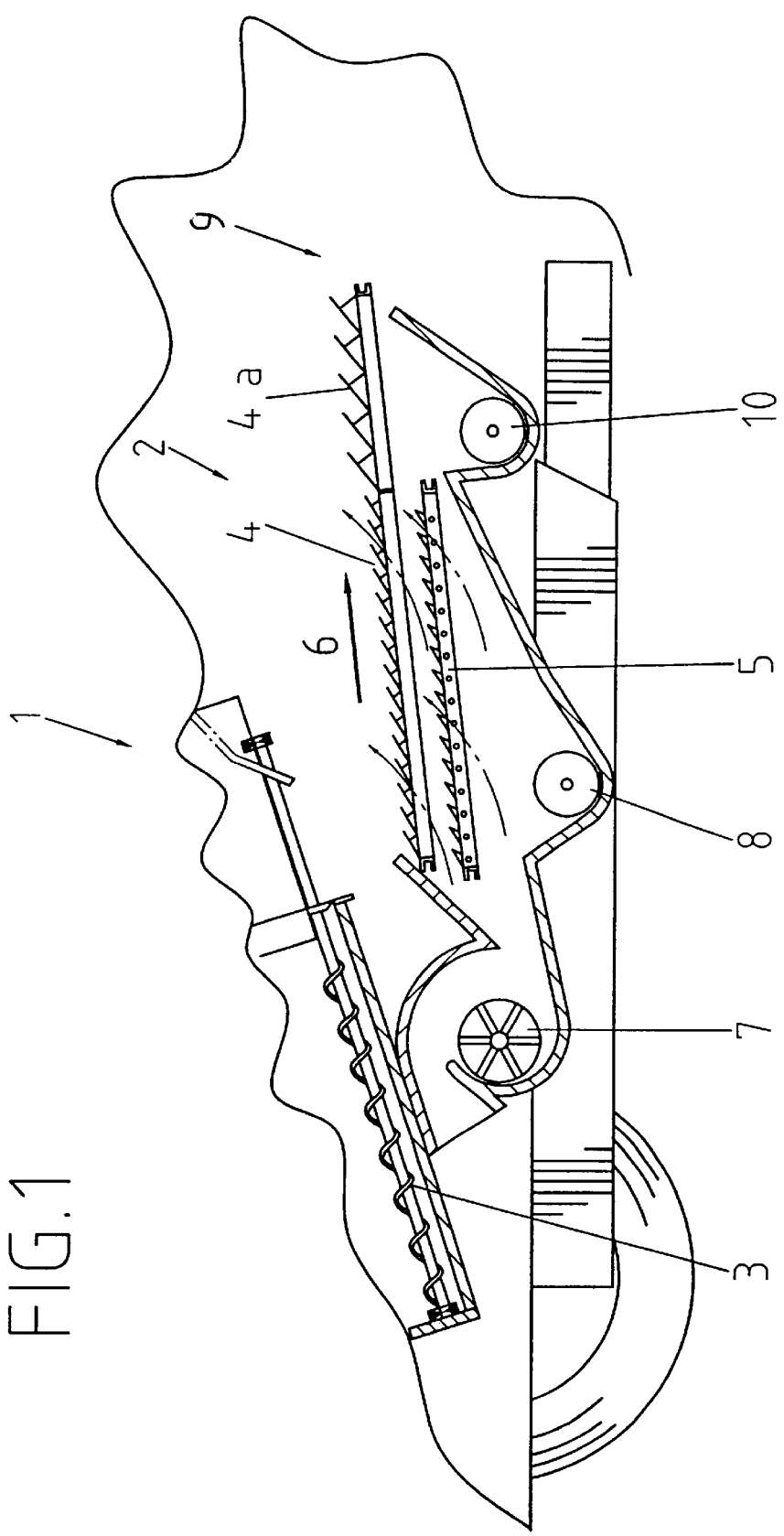
FIG. 1 is a schematic view of a longitudinal section through a portion of a combine-harvester.

FIG. 1 shows a longitudinal section of a portion 1 of a combine-harvester. A cleaning system 2 and a conveying device 3 are shown. The mixture of grains and straw or chaff parts, which exit, the not shown threshing device, reach, by means of the conveying device 3, the upper sieve 4, which is designed according to the invention. The screened grains reach the below arranged fine sieve 5 and are separated from the rest of the non-grain-components. The straw portion or chaff portion, which reaches the back of the sieve, exits via the end 9 of the sieve extension to the outside. Possible still enclosed grains and non-threshed ear parts or panicle parts are further sieved by means of the sieve extension 4a. The sieve extension 4a has usually larger pass-through-openings than the first sieve 4 and are passed to the below feedback-conveyor 10. The feedback-conveyor 10 recycles this material to the threshing device. The grains are conveyed by means of the grain conveyor 8 to the grain collecting tank. To separate lighter chaff parts and the rest of the lighter non-grain-components from the grains, a fan 7 is provided. The air stream from the fan 7 blows through both sieves 4, 5.

The upper sieve 4, which is shown in FIG. 1, is represented in sections in more detail in FIGS. 2 to 4. FIG. 2 shows the sieve surface 12 in the conveying direction 6. The sieve surface has portions 13, 13a, 13b, 13c, which are constructed in the same way and are taken up between the two frame parts 11. The detailed design of these portions 13, 13a, 13b, 13c is especially shown in FIG. 3. This is described in more detail by two portions, i.e. the portions 13 and 13a. As can be seen in connection with portion 13a, this is represented by a profile 14a. Corresponding profiles 14, 14b, 14c represent the further portions 13, 13b, 13c. Both profiles 14, 14a comprise respectively a first leg 16, which is arranged at an angle 17 to a first horizontal plane 15. The second leg 18, which abuts the first leg 16 in the connection area 19, extends from the first plane 15 at an angle 20. Angle 20 is larger than the angle 17.

An extension 22 is attached to the end of the second leg 17. This extension 22 runs substantially parallel to the first leg 16. However, it runs from the second leg 18 in an opposing direction. The portion 13, which is arranged ahead of the portion 13a, is arranged such that the leg 16, which forms part of profile 14, abuts or connects the second leg 18 of the profile 14a in the abutting area 21. An extension 22 runs along the first leg 16. The extension 22 is in a transverse direction of the sieve. The extension 22 projects to a second plane 23, which is more or less arranged at right angle to the first plane 15. The extension 22 is, however, connected to the first leg 16 or is integrally formed with it. The second plane 23 contains connection area 19. The extension 22 ends, via an edge 24, at the second plane 23. The removal effect of the edge 24 on the stems 27, which reach it, can be increased by the zigzag serrated portions of the edge as seen from FIG. 2. Openings 26 remove grain and are formed in the second leg 18. The openings 26 run transverse to the conveyor 6. The size of the openings 26 is determined by a corresponding number of separation webs 28. This can especially be seen from FIG. 4. Thus, the size of the openings 26 is different from sieve to sieve and depends on which harvesting material the sieve is to be used. The openings 26 can be formed depending on the use. They can be round, oval, rectangular or square depending of the conditions of usage.

While the above detailed description describes the preferred embodiment of the present invention, the invention is susceptible to modification, variation and alteration without deviating from the scope and fair meaning of the subjoined claims.

What is claimed is:

1. A sieve for a thresher comprising:
    a sieve surface running parallel to a conveying direction, when seen in a section, includes a base-profile with a zigzag configuration, said base is built up from repeated consecutive portions with each portion including a first leg and a second leg, said first and second legs in the said section enclose an angle between each other, said first leg being arranged ahead of said second leg in the conveying direction enclosing a first angle with a first imaginative plane, said first angle is smaller than a second angle, which is formed between the second leg and the first plane, and said first and second legs form a connection area transverse to the conveying direction and openings being distributed in the second leg, and said first leg including an extension which continuously runs along the first leg and ends in an edge, said edge projects in conveying direction beyond said connection area between the first leg and the second leg towards a portion, which is arranged ahead in the conveying direction.

2. The sieve according to claim 1, wherein the extension is arranged in a plane with the first leg.

3. The sieve according to claim 1, wherein the extension is formed integrally with the first leg.

4. The sieve according to claim 1, wherein the edge of the extension reaches at the most to a second imaginative plane, said second plane being arranged at a right angle to the first plane and contains the connection area between said first leg and second leg, which belong to a portion, which in the conveying direction is arranged ahead of a second portion, whose first leg has the extension.

5. The sieve according to claim 1, wherein the sieve surface is constructed from profiles running transversely to the conveying direction and each profile corresponds, respectively, to a portion, each profile having a connection leg, which seen in a section parallel to the conveying direction projects from the end of the second leg to the first leg in an opposite direction and is arranged parallel to the first leg.

6. The sieve according to claim 4, wherein the profiles are made from sheet metal by bending said sheet metal.

7. The sieve according to claim 4, wherein the profiles are formed from casting profiles made from aluminum or plastic material or said profiles are formed completely as a sieve from molded aluminum or plastic material.

8. The sieve according to claim 1, wherein the edge of the extension is serrated.

9. The sieve according to claim 1, wherein the edge is sharp-edged.

* * * * *